United States Patent
Tajima et al.

(10) Patent No.: US 6,431,323 B2
(45) Date of Patent: Aug. 13, 2002

(54) ELEVATOR POWER MANAGEMENT SYSTEM HAVING POWER STORAGE APPARATUS MAINTAINING A PARTICULAR CHARGE IN ACCORDANCE WITH TIME OF DAY

(75) Inventors: Shinobu Tajima; Hiroshi Araki; Ikuro Suga; Kazuyuki Kobayashi, all of Tokyo (JP)

(73) Assignees: Mitsubishi Denki Kabushiki Kaisha; The Tokyo Electric Power Company, Incorporated, both of Tokyo (JP)

( * ) Notice: Subject to any disclaimer, the term of this patent is extended or adjusted under 35 U.S.C. 154(b) by 0 days.

(21) Appl. No.: 09/741,159

(22) Filed: Dec. 21, 2000

(30) Foreign Application Priority Data

Dec. 28, 1999 (JP) ............................................. 11-374880

(51) Int. Cl.⁷ ................................................. B66B 1/06

(52) U.S. Cl. ....................................... 187/290; 187/296

(58) Field of Search ................................. 187/290, 289, 187/247, 296, 297; 320/162, 106, 153, 155, 160, 138, 133; 318/139

(56) References Cited

U.S. PATENT DOCUMENTS

| | | | | |
|---|---|---|---|---|
| 5,058,710 A | * | 10/1991 | Iwasa | 187/114 |
| 5,184,058 A | * | 2/1993 | Hesse et al. | 320/4 |
| 5,548,200 A | * | 8/1996 | Nor et al. | 320/27 |

FOREIGN PATENT DOCUMENTS

| | | |
|---|---|---|
| JP | 5-338947 | 12/1993 |
| JP | 11-299275 | 10/1999 |

* cited by examiner

Primary Examiner—Jonathan Salata
(74) Attorney, Agent, or Firm—Leydig, Voit & Mayer, Ltd.

(57) ABSTRACT

To reduce total power required to drive an elevator by a commercial power supply during a peak power-consumption time period, for instance, an afternoon in summer time, a control apparatus includes a converter for rectifying AC electric power into DC electric power; an inverter for inverting the DC electric power into AC electric power having a variable voltage and a variable frequency; a motor driven by the AC electric power having the variable voltage and the variable frequency to operate an elevator; a power storage apparatus for storing electric power; and a charge/discharge control for controlling charging and discharging operation of the power storage apparatus based upon a charging target value.

8 Claims, 5 Drawing Sheets

FIG. 5

ELEVATOR POWER MANAGEMENT SYSTEM HAVING POWER STORAGE APPARATUS MAINTAINING A PARTICULAR CHARGE IN ACCORDANCE WITH TIME OF DAY

BACKGROUND OF THE INVENTION

1. Field of the Invention

The present invention generally relates to an elevator control apparatus using a power storage apparatus.

2. Description of the Related Art

Figure 5:
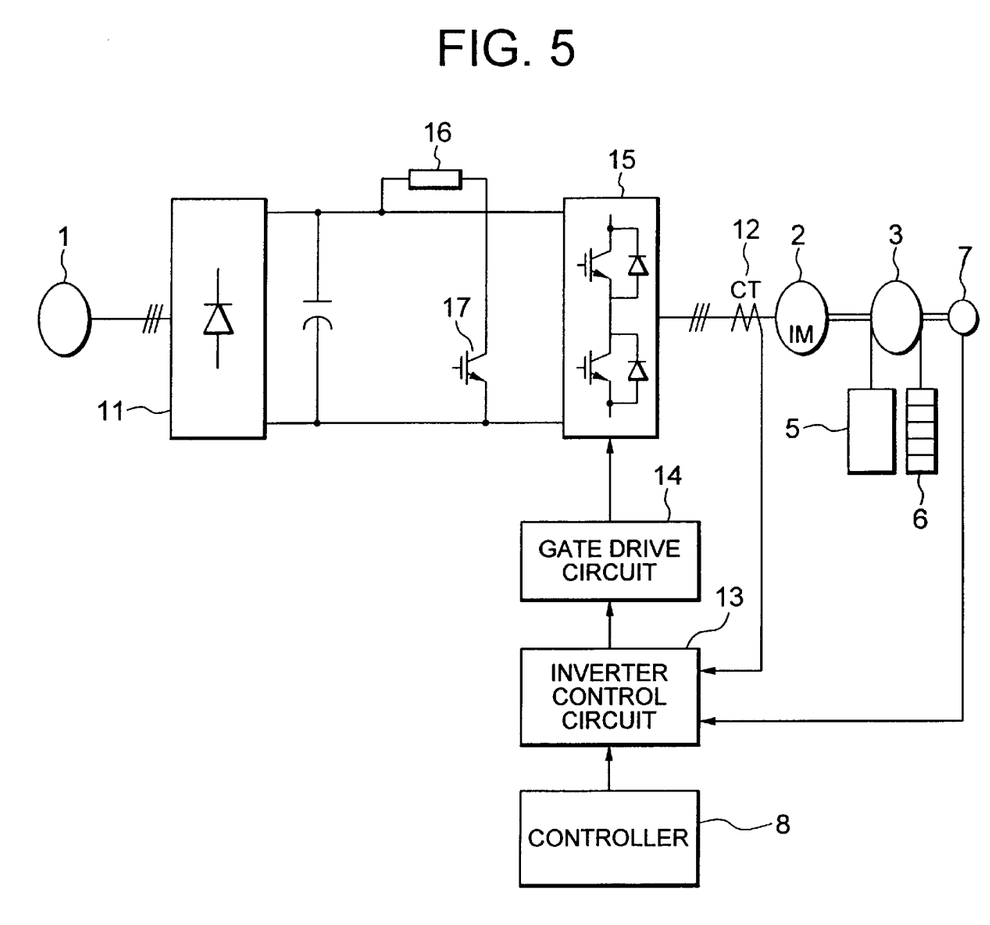
FIG. 5 schematically shows an arrangement of a conventional control apparatus for an elevator.

One conventional control apparatus of an elevator is indicated in FIG. 5. Referring now to a structural arrangement of FIG. 5, this conventional elevator control apparatus includes a motor 2, such as an induction motor, coupled to a commercial AC power supply 1 (referred to as a "commercial power supply" hereinafter), a drive machine 3, a rope 4, a car 5 of the elevator, and a balance weight 6. Both the elevator car 5 and the balance weight 6 connected to opposite ends of the rope 4 can be elevated by rotary-driving this drive machine 3. As a result, passengers in the elevator car 5 can be conveyed to a predetermined floor.

In FIG. 5, reference numeral 8 shows a controller. The controller 8 determines starting/stopping of the elevator, and produces a position/speed instruction of this elevator. Reference numeral 11 indicates a converter which is constructed of a diode and the like. This converter 11 rectifies AC electric power supplied from the commercial power supply 1 to produce DC electric power. Reference numeral 15 represents an inverter which is constructed of a transistor, an IGBT (Insulated-Gate Bipolar Transistor), and the like. This inverter 15 inverts the DC electric power converted by the converter 11 into AC electric power having a variable AC voltage and a variable AC frequency. Reference numeral 16 shows a regenerative resistor. This regenerative registor 16 is connected to a bus line existing between the converter 11 and the inverter 15. Also, reference numeral 17 indicates a regenerative resistor control circuit which is connected to both the regenerative resistor 16 and the bus line.

The above-explained balance weight 6 of the elevator is designed to be balanced when the properly-selected number of passengers get into the elevator car 5. As this properly-selected number of passengers, for example, half of the a capacity of this car 5 may be selected. Now, in such a case that the entire weight of the car 5 into which this properly-selected number of passengers gets is balanced with the balance weight 6, operation of this elevator (car 5) will now be considered. When this elevator is accelerated, the speed of this elevator is increased while this elevator consumes the electric power supplied from the commercial power supply 1. Conversely, when the elevator is decelerated, the speed of this elevator is decreased while returning the stored kinetic energy to the corresponding electric power supply. In this case, such an elevator operation in which a speed of this elevator is increased while consuming electric power supplied from this commercial power supply 1 is referred to as a "powering operation." Also, such an elevator operation in which a speed of this elevator is decreased while returning kinetic energy to electric power is referred to as "regenerative operation." The electric power produced by this regenerative operation is converted into thermal energy by both the regenerative resistor 16 and the regenerative resistor control circuit 17 so as to be consumed.

Also, reference numeral 7 shows an encoder which is provided on the drive machine 3. Reference numeral 12 indicates a current detecting apparatus. This current detecting apparatus 12 is provided between the motor 2 and the inverter 15. Reference numeral 13 indicates an inverter control circuit which is connected to the encoder 7, the controller 8, and the current detecting apparatus 12. Reference numeral 14 indicates a gate drive circuit which is connected to both the inverter control circuit 13 and the inverter 15.

In response to the instruction issued from the controller 8, the inverter control circuit 13 rotary-drives the motor 2 based on both the current feedback from the current detecting apparatus 12 and the speed feedback from the encoder 7 mounted on the drive machine 3, so that this inverter control circuit 13 can realize both positional and speed control of the elevator. Also, the inverter control circuit 13 controls the output voltage and frequency the inverter 15 via the gate drive circuit 14.

The conventional elevator control apparatus continuously receives the supply of electric power from the commercial power supply 1 to operate this elevator irrespective of degree of power demands. For example, peak electric power is required in the afternoon of summer time. During this time period, total power consumption is wanted to be reduced. However, the conventional elevator control apparatus can hardly reduce total power consumption during such a peak power-consumption time period.

As previously explained, since the electric power is consumed in synchronization with the elevator operation in the conventional elevator control apparatus, total power consumption during the peak power-consumption time period cannot be reduced.

SUMMARY OF THE INVENTION

The present invention has been made to solve the above-explained problems, and therefore, has an object to provide an elevator control apparatus reducing total power consumption of a commercial power supply during, for instance, a peak power-consumption-time period.

An elevator control apparatus, according to an aspect of the present invention, is comprised of: a converter for rectifying AC electric power to be converted into DC electric power; an inverter for inverting the DC electric power into AC electric power having a variable voltage and a variable frequency; a motor driven by the AC electric power having the variable voltage and the variable frequency so as to operate an elevator; a power storage apparatus for charging thereinto DC electric power; and charge/discharge control means for controlling charging/discharging operation with respect to the power storage apparatus based upon a charging target value every time with respect to the power storage apparatus.

Also, the charging target value owned by the elevator control apparatus of the present invention is set as follows: a target value during a peak power-consumption time period is set to be a small value in order that a total power consumption during such a peak power-consumption time period can be reduced.

Also, the charging target value owned by the elevator control apparatus, according to the present invention, corresponds to such a charging amount by which at least the elevator is operable in an emergency case.

Also, according to the elevator control apparatus of the present invention, in such a case that a charging amount of the power storage apparatus is smaller than the charging target value, the discharging operation from the power storage apparatus is stopped.

Furthermore, according to the elevator control apparatus of the present invention, when the elevator is stopped, the power storage apparatus is charged by using electric power supplied from a commercial power supply.

Also, according to the elevator control apparatus of the present invention, when the power storage apparatus is charged by using the electric power supplied from a commercial power supply, a current value of the commercial power supply is limited.

BRIEF DESCRIPTION OF THE DRAWINGS

For a better understanding of the present invention, reference is made of a detailed description to be read in conjunction with the accompanying drawings, in which.

DETAILED DESCRIPTION OF THE PREFERRED EMBODIMENTS

Referring now to drawings, various preferred embodiments of the present invention will be described more in detail.

ARRANGEMENT OF FIRST ELEVATOR CONTROL APPARATUS

Figure 1:
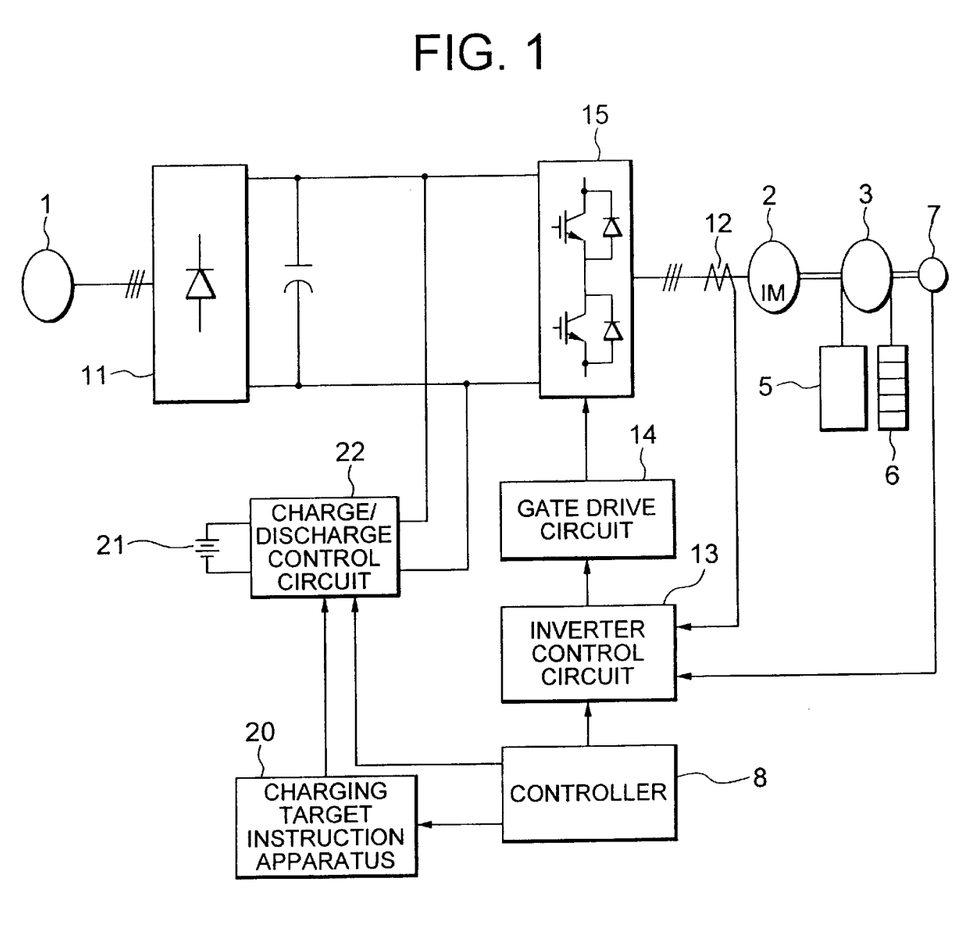
FIG. 1 schematically indicates an arrangement of a control apparatus of an elevator, according to an embodiment mode 1 of the present invention.

First, a control apparatus of an elevator, according to an embodiment mode 1 of the present invention, will now be described with reference to FIG. 1. That is, FIG. 1 is a structural diagram schematically indicating an arrangement of the elevator control apparatus according to this embodiment mode 1. In FIG. 1, reference numeral 20 indicates a charging target instruction apparatus which is constituted by a general-purpose microprocessor and a program operable in this microprocessor. The charging target instruction apparatus 20 is connected to a controller 8. This charging target instruction apparatus 20 sets a charging target value. Reference numeral 21 indicates a power storage apparatus which is constituted by a battery and the like.

Reference numeral 22 indicates a charge/discharge control circuit which is arranged by a DC/DC converter and the like. This charge/discharge control circuit 22 is connected to bus lines coupled among the charging target instruction apparatus 20, the power storage apparatus 21, the converter 11, and the inverter 15.

Also, the charging target value outputted from the charging target instruction apparatus 20 is entered into this charge/discharge control circuit 22.

It should be noted that the inverter 15 owns a function of another inverting operation. That is, AC regerative power generated from the motor 2 is inverted into DC regenerative power.

It should also be noted the same reference numerals shown in FIG. 5 will be employed as those for denoting the same, or similar circuit elements of FIG. 1, and therefore, descriptions thereof are omitted. Only different circuit portions from those of FIG. 5 will be explained.

Figure 2:
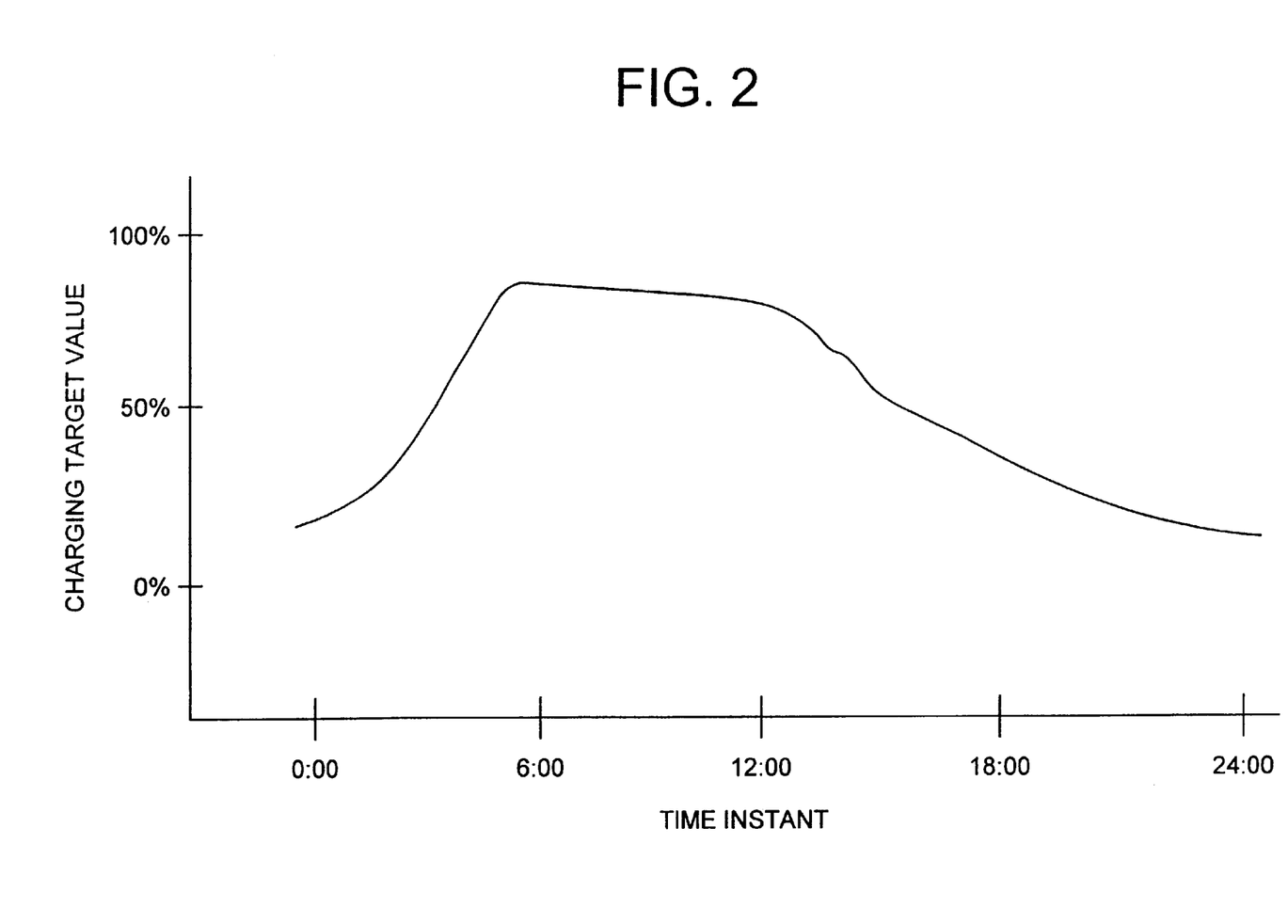
FIG. 2 is a line graph representing a charging target value of a power storage apparatus every hour, which is set to a charging target instruction apparatus of the elevator control apparatus shown in FIG. 1.

Next, the charging target value set in the charging target instruction apparatus 20 will now be explained with reference to FIG. 2. FIG. 2 is a line graph indicative of a charging target value of the power storage apparatus 21 every hour.

In an example of this charging target value shown in FIG. 2, the power storage apparatus 21 is charged by using night-time (e.g., 0:00 AM to 6:00 AM) electric power; the electric power stored in this power storage apparatus 21 is gradually discharged therefrom so as to be used to operate the elevator during day time (e.g., 12:00 PM to 6:00 PM); a charging amount of this power storage apparatus 21 is relatively reduced during evening time (e.g., 6:00 PM to 0:00 PM); and a charging amount of this power storage apparatus 21 is increased during night time. In the night time, substantially no elevator is operated. As explained above, the power storage apparatus 21 is charged in a time range (night time) during which substantially no elevator is operated, and furthermore, the charging target value is gradually increased in order that the instantaneous power amount required for charging the power storage apparatus 21 is suppressed. As a result, the electric power rates required for charging the power storage apparatus 21 may be suppressed to low rates. Then, since the charging target value may be made as a maximum charging target value at a time (for example, 6:00 AM) before full scale operation of the elevator is commenced, this elevator control apparatus can satisfactorily accept such full scale operation of the elevator.

It should also be understood that if the power storage apparatus 21 is brought into the fully charged state in a time range while the elevator is operated, then the regenerative electric power generated by the regenerative operation of the elevator may not be stored into this power storage apparatus 21, but may be consumed as generation energy, namely a waste of regenerative power. This fact cannot satisfy effective charging operation in view of energy-saving and electric power-saving. As a consequence, while the power storage apparatus 21 is allowable to be continuously charged by the regenerative power, and may be preferably charged by the commercial power supply. For instance, while two sorts of charging target value are set, namely a charge-end target value (a first value) and a charge-start instruction value (a second value), the power storage apparatus 21 is charged by way of the regenerative power when the charging amount is in between the two charging target values, whereas the power storage apparatus 21 is charged by way of both the commercial power supply and the regenerative power when the charging amount is equal to or smaller than this charge-start instruction value. At this charge-end target value, the charging operation is ended. The charge-start instruction value is set to be lower than this charge-end target value, and commences the charging operation by the commercial power supply when the charging amount is reduced.

Also, even in such a case that the charging target value is set to the minimum value in the night time range during which most of the elevators are stopped, the power storage apparatus 21 is required to have a certain charging amount in order to cope with an emergency such as power interruption. As explained above, since the power storage apparatus 21 owns such a certain charging amount, even when emergencies such as power interruption and earthquake happen to occur, occurrences of secondary disasters can be prevented. For example, passengers are locked up in elevators.

FIRST ELEVATOR CONTROL METHOD

Next, a description will now be made of an elevator control method executed in the elevator control apparatus according to the first embodiment mode. For the sake of a simple explanation, it is now assumed that the charging operation from the commercial power supply 1 to the power storage apparatus 21 is carried out when the elevator is stopped, and the elevator is basically operated while electric power is supplied thereto from the power storage apparatus 21.

When the elevator is operated, the charge/discharge control circuit 22 controls the voltage outputted to the inverter 15 so as to supply the electric power to the inverter 15.

It should also be noted that the charge/discharge control circuit 22 measures/controls both the current value and the voltage value with respect to the electric power outputted from the power storage apparatus 21, so that this charge/discharge control circuit 22 may continuously grasp both the charging amount and the use amount of the electric power in the power storage apparatus 21.

Also, even when the regenerative power is produced by way of the regenerative operation of the elevator, namely even when the regenerative power is returned to the power storage apparatus 21 so as to be stored thereinto, the charge/discharge control circuit 22 measures/controls both the current value and the voltage value of this regenerative power, and thus may continuously grasp the charging amount of the power storage apparatus 21.

It should also be understood that when the charging amount of the power storage apparatus 21 becomes equal to or smaller than a predetermined charging target value set by the charging target instruction apparatus 20, the supply of electric power from the power storage apparatus 20 to the inverter 15 is partially limited while the elevator is driven in the powering operation mode, and this supply of electric power is replaced by the supply of electric power from the commercial power supply 1. Alternatively, the supply of electric power from the power storage apparatus 21 may not be partially limited, but may be entirely limited. In this alternative case, the supply of electric power to the inverter 15 is completely carried out from the commercial power supply 1.

Also, in such a case that the charging amount of the power storage apparatus 21 becomes equal to or smaller than a predetermined charging target value set by the charging target instruction apparatus 20, when the elevator operation is stopped, the power storage apparatus 21 may be charged by way of the commercial power supply 1 so as to achieve such a predetermined charging target value.

Further, since the charging target value just before a peak power-consumption time period is set to a large target value, a sufficiently large amount of electric power can be stored in the power storage apparatus 21 just before the peak power-consumption time period. Also, since this charging target value is set to a small target value during the peak power-consumption time period, the elevator can be operated and controlled by using the electric power sufficiently stored in the power storage apparatus 21 during the peak power-consumption time period. As a consequence, the power consumption of the commercial power supply 1 during the peak power-consumption time period can be suppressed. Also, in such a case that the charging target value in the peak power-consumption time period is gradually decreased while time has elapsed, the electric power is similarly and gradually discharged from the power storage apparatus 21. As a result, it is possible to avoid such a phenomenon that the entire electric power is completely discharged at an initial stage of the peak power-consumption time period, and therefore the electric power can be supplied under a stable condition.

In the usual case, such a peak power-consumption time period is commenced after 12:00 PM, especially 1:00 PM to 4:00 PM. For instance, a power-consumption peak is higher especially in the afternoon of summer time.

As previously described in detail, in accordance with the elevator control apparatus of this first embodiment mode, while the electric power is charged to the power storage apparatus 21, the operation of this elevator is controlled by using this stored electric power. As a result, a total power consumption required for operating and also controlling the elevator can be reduced. In particular, a total power consumption of the commercial power supply during the peak power-consumption time period can be reduced. Also, in accordance with the elevator control apparatus of this first embodiment mode, since the power storage apparatus 21 is charged by using the regenerative power, a total amount of electric power energy can be reduced, resulting in an energy-saving effect.

Also, in accordance with the elevator control apparatus of this first embodiment mode, the charging/discharging control operation is carried out in such a manner that the regenerative power is charged into the power storage apparatus. As a result, the regenerative power can be effectively utilized.

Also, in accordance with the elevator control apparatus of this first embodiment mode, since the power storage apparatus 21 is charged based upon the charging target value previously set by the charging target instruction apparatus 20, a total amount of electric power of the commercial power supply 1 at such a peak power-consumption time period during day time in summer can be restricted.

Furthermore, in accordance with the elevator control apparatus of this first embodiment mode, the power storage apparatus 21 is charged by using the night-time electric power, and the stored electric energy is discharged at the peak power-consumption time period during day time, so that a total amount of electric power of the commercial power supply 1 can be limited based on the charging target value previously set by the charging target instruction apparatus 20. As a consequence, while the total amount of electric power of the commercial power supply at the peak power-consumption time period is suppressed to a low consumption value, the elevator can be operated and controlled.

Recently, reductions in a total power consumption during a peak power-consumption time period can suppress excessively large amounts of power generating facilities and furthermore, can decrease loads given to earth environments. Such power reductions are also socially required in connection with the earth environmental problems. Accordingly, the power reductions during the peak power-consumption time period may be one of the very important aspects, and therefore, the elevator control apparatus according to the present invention may have a significant key point.

Another elevator control method may be conceived, since electric power rates at night time are cheaper than electric power rates at day time. Under this electric power rates condition, while the capacity of the power storage apparatus 21 is set to a sufficiently large capacity, a total power consumption required for operating the elevator per 1 day may be completely supplied from the electric power stored in this power storage apparatus 21 during night time. However, this elevator control method may have a practical problem. That is, if the capacity of the power storage apparatus 21 is set to such a large capacity, then the facility cost is considerably increased.

As a consequence, the desirable capacity of the power storage apparatus 21 should be selected for the elevator control apparatus by considering the electric power rates required to operate the elevator, namely the operation expense, and further, the manufacturing cost of this power storage apparatus 21, namely the product cost, i,e., totally low cost.

SECOND ELEVATOR CONTROL APPARATUS

Next, a control apparatus of an elevator, according to a second embodiment mode of the present invention, will now be explained. It should be understood that since an arrangement of the elevator control apparatus according to this second embodiment mode is similar to that of the elevator control apparatus shown in FIG. 1 according to the above-explained first embodiment mode, explanations thereof are omitted.

Subsequently, a description will now be made of an elevator control method executed in the elevator control apparatus according to this second embodiment mode. As to the elevator control method performed in the elevator control apparatus of this second embodiment mode, a charging amount of a power storage apparatus 21 is controlled based upon a charging target value set by a charging target instruction apparatus 20, and furthermore, charging/discharging operations are controlled in response to a charging condition of this power storage apparatus 21.

First, when a charging amount stored in the power storage apparatus 21 is equal to or larger than a predetermined charging target value, a charge/discharge control apparatus 22 controls the power storage apparatus 21 to discharge therefrom electric power which is required to perform powering operation of the elevator, so that this charge/charge control apparatus 22 operates and controls the elevator. Also, regenerative electric power generated while the elevator is driven in the regenerative operation mode is charged into the power storage apparatus 21 so as to replenish such electric power which is discharged while the elevator is driven in the powering operation mode.

Also, when a charging amount stored in the power storage apparatus 21 is smaller than the predetermined charging target value, the charge/discharge control apparatus 22 controls the commercial power supply 1 to supply therefrom electric power which is required while the elevator is driven in the powering operation mode, and stops the supply of electric power from the power storage apparatus 21. Then, this charge/discharge control apparatus 22 performs such a control operation that regenerative power generated while the elevator is driven in the regenerative operation mode is charged to the power storage apparatus 21.

In general, when the power storage apparatus 21 is directly charged by using the commercial power supply 1 and the charged electric power is outputted to the inverter 15, there is a more or less power loss due to a relation to a charging/discharging efficiency. However, in the elevator control apparatus of this second embodiment mode, such regenerative power which has been conventionally converted into thermal energy to be consumed can be used to charge the power storage apparatus 21, resulting in an improvement of the energy-saving effect.

Also, while the charging target value is set to a lower charging target value during a peak power-consumption time period and the charging target value is set to a higher charging target value during the normal power consumption time period, the regenerative power may be charged into the power storage apparatus 21 during the normal power consumption time period whereas this charged regenerative power may be discharged therefrom during the peak power-consumption time period. As a result, a total amount of electric power of the commercial power supply 1 during the peak power-consumption time period may be reduced.

As previously explained, while the regenerative power generated when the elevator is driven in the regenerative operation mode is charged into the power storage apparatus 21, this charged regenerative power is utilized so as to drive the elevator in the powering operation mode, so that the reduction effect in electric power of the commercial power supply 1 can be achieved. More specifically, a total power consumption during the peak power-consumption time period of the commercial power supply 1 can be reduced. It should also be noted that the regenerative power charged in the power storage apparatus 21 may be used to partially replenish, or entirely replenish the electric power required to drive the elevator in the powering operation mode. When the elevator control apparatus is equipped with such a power storage apparatus 21 capable of partially replenishing the electric power required to drive the elevator in the powering operation mode, this power storage apparatus 21 can be manufactured in low cost, as compared with another power storage apparatus capable of completely supplying all electric power required to drive the elevator in the powering operation mode.

THIRD ELEVATOR CONTROL APPARATUS

Next, a control apparatus of an elevator, according to a third embodiment mode of the present invention, will now be explained. It should be understood that since an arrangement of the elevator control apparatus according to this third embodiment mode is similar to that of the elevator control apparatus shown in FIG. 1 according to the above-explained first embodiment mode, explanations thereof are omitted.

Subsequently, a description will now be made of an elevator control method executed in the elevator control apparatus according to this third embodiment mode.

First, when a charging amount stored in the power storage apparatus 21 is equal to or larger than a charging target value, a charge/discharge control apparatus 22 executes such a control operation as follows: That is, electric power is discharged from the power storage apparatus 21 which is required to perform powering operation of the elevator, so that this electric power is supplied to the elevator. Also, regenerative power generated while the elevator is driven in the regenerative operation mode is charged into to the power storage apparatus 21.

Also, when a charging amount stored in the power storage apparatus 21 is smaller than the charging target value, the charge/discharge control apparatus 22 controls the charging/charging operation in the commercial power supply 1. As indicated in the second embodiment mode, the charging/discharging operation is controlled while the elevator is driven in both the regenerative operation mode and the powering operation mode. In addition, in such a case that the charging amount of the power storage apparatus 21 is smaller than the charging target value, when the elevator is stopped, the power storage apparatus 21 of this embodiment mode is charged by the commercial power supply 1 under control of the charge/discharge control apparatus 22.

It should be understood that the recharging operation by the commercial power supply 1 is carried out in order to satisfy the charging target value.

Also, the charging operation to this power storage apparatus 21 is controlled in accordance with the below-mentioned manner.

First, just before the peak power-consumption time period of the commercial power supply 1, the charging target value of the power storage apparatus 21 is set to be larger than the electric power amount used in this peak time period. Also, during this peak time period, the charging target value of the power storage apparatus 21 is set to be smaller than the above-explained charging target value set just before the peak power-consumption time period.

Then, during the peak power-consumption time period, the elevator is operated by mainly receiving the electric power supplied from the power storage apparatus 21.

As previously explained, since the charging target value during the peak time period is set to be such a small target value, when the elevator is stopped, this elevator can be controlled by receiving a small amount of charging power from the commercial power supply 1. As a result, the charging operation to the power storage apparatus 21 can be continuously controlled in a proper manner, and furthermore, the total amount of electric power of the commercial power supply 1 during the peak time period can be reduced.

On the other hand, while various improvements have been made in the power storage apparatus 21, the manufacturing cost thereof is gradually decreased. However, if the power storage apparatus has large capacity enough to supply all electric power required to operate the elevator during day time from the apparatus, then the manufacturing cost thereof is still expensive. Therefore, the combination between the commercial power supply and the power storage apparatus as explained in this third embodiment mode is realized.

As explained above, since the elevator control apparatus of this third embodiment mode operates the elevator while controlling the charging/discharging operation of the power storage apparatus based upon a predetermined charging target value, this elevator control apparatus is no longer equipped with such a high-cost power storage apparatus 21 having a large capacity, and therefore, can be constituted in low cost.

Also, in accordance with the elevator control apparatus of this third embodiment mode, the regenerative power generated when the elevator is driven in the regenerative operation mode is charged to the power storage apparatus 21 so as to be utilized. As a result, the energy-saving effect can be achieved. In particular, since a total amount of electric power used during the peak power-consumption time period of the commercial power supply 1 can be reduced, this elevator control apparatus can contribute to prevention of increasing in the commercial power generating facility.

FOURTH ELEVATOR CONTROL APPARATUS

Next, a control apparatus of an elevator, according to a fourth embodiment mode of the present invention, will now be explained. It should be understood that since an arrangement of the elevator control apparatus according to this fourth embodiment mode is similar to that of the elevator control apparatus shown in FIG. 1 according to the above-explained first embodiment mode, explanations thereof are omitted.

Subsequently, a description will now be made of an elevator control method executed in the elevator control apparatus according to this fourth embodiment mode.

First, when a charging amount stored in the power storage apparatus 21 is equal to or larger than a charging target value, a charging/discharging control apparatus 22 controls the power storage apparatus 21 to discharge therefrom electric power and then operates the elevator in the powering operation mode by using the electric power which has been changed in this power storage apparatus 21. Also, in this case, the charge/discharge control apparatus 22 uses the regenerative power generated when the elevator is driven in the regenerative operation mode so as to charge this regenerative power into the power storage apparatus 21.

Also, when a charging amount stored in the power storage apparatus 21 is equal to or smaller than the charging target value, the charge/discharge control apparatus 22 executes the following charging/discharging control operations with respect to the power storage apparatus 21. That is, these charging/discharging control operations correspond to such conditions that the elevator is driven in the regenerative operation mode, and the powering operation mode, and also the elevator is stopped as represented in the third embodiment mode.

Then, in the case that the charging amount stored in the power storage apparatus 21 is equal to or smaller than a predetermined charging target value and furthermore the elevator is stopped, the power storage apparatus 21 is charged by using the electric power supplied from the commercial power supply 1. At this time, the recharging/charging control apparatus 22 may restrict the electric power to be charged into the power storage apparatus 21. In other words, while the power storage apparatus 21 is charged by way of the commercial power supply 1, the charge/discharge control apparatus 22 controls the electric power supplied from the commercial power supply 1 by using a power limiting value for limiting a current value and a voltage value, for example, limited within 1 KW.

The reason why the charging operation to the power storage apparatus 21 is controlled based upon the power limiting value with respect to the supplied power is given to consider the electric power rate system. In general, an electric power rate system is not directly proportional only to a used electric power amount (Kwh), but also is directly proportional to used maximum electric power (KW). Therefore, in order to reduce electric power rates of the elevator control apparatus, not only an energy-saving in which total amount (Kwh) of electric power supplied from the commercial power supply 1 by storing and reusing the regenerative power must be reduced, but also the maximum electric power (KW) required when the commercial power supply 1 is used must be limited.

Therefore, in accordance with the elevator control apparatus of this four th embodiment mode, storing/reusing of the re generative power are limited. Moreover, the maximum electric power supplied from the commercial power supply 1 is limited. As a consequence, it is possible to accomplish such an elevator control apparatus capable of operating the elevator in lower cost.

ARRANGEMENT OF FIFTH ELEVATOR CONTROL APPARATUS

Figure 3:
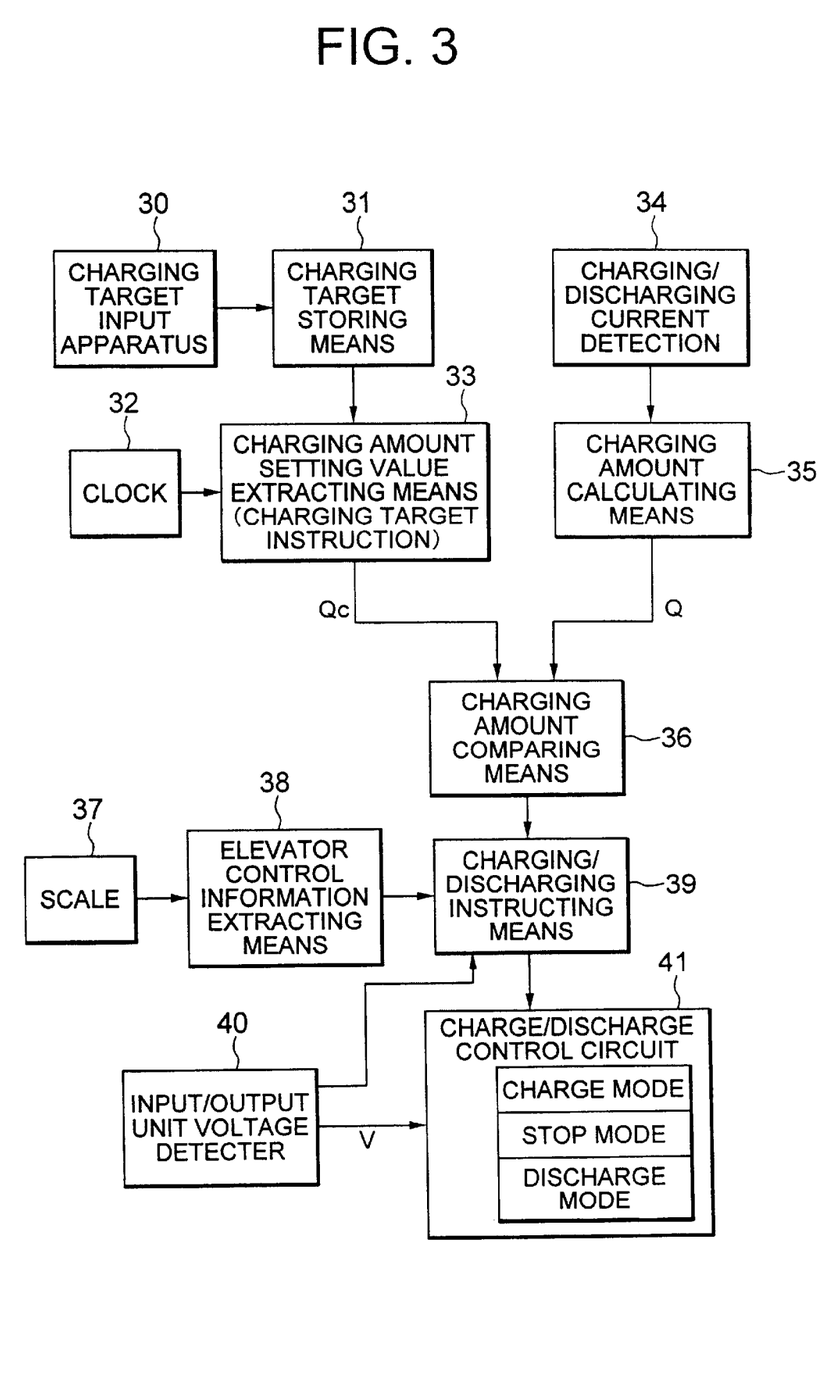
FIG. 3 schematically represents an arrangement of a control apparatus of an elevator, according to an embodiment mode 5 of the present invention.

Referring now to FIG. 3, an elevator control apparatus according to a f if th embodiment mode of the present invention will be described. FIG. 3 is a structural diagram schematically indicating an arrangement of the elevator control apparatus according to this fifth embodiment mode. In FIG. 30, reference numeral 30 indicates a charging target input apparatus which is constituted by a personal computer and the like. This charging target input apparatus 30 corresponds to a terminal used to input a charging target value to either a power storage apparatus 21 or a charging target instruction apparatus 20 employed in the elevator control apparatus according to this fifth embodiment mode. It should be noted that a charging target value is entered to the charging target input apparatus 30 according to this fifth embodiment mode in relation to time, day, week, month, season, year, and elevator operation condition. Alternatively, as this charging target value, while a plurality of items may be combined with each other, such a combined item may be set to this charging target input apparatus 30.

Also, reference numeral 31 represents a charging target storing means which is connected to the charging target input apparatus 30. In this charging target storing means 31, the charging target value entered by the charging target input apparatus 30 is stored.

Reference numeral 32 shows a clock. This clock 32 outputs information related to either a present time instant or a calendar at this time.

Reference numeral 33 indicates a charging amount setting value extracting means which is connected to both the charging target storing means 31 and the clock 32. This charging amount setting value extracting means 33 extracts a charging target value "Qc" from the charging target storing means 31 based upon the information related to the time and the calendar entered from the clock 32. This charging target value Qc is defined based on this time and calendar.

Reference numeral 34 shows a charging/discharging current detector, namely a so-called "current detector". This charging/ discharging current detector 34 detects a current passing/flowing from a bus line connected between a converter 11 and an inverter 15 into a charge/discharge control circuit 41.

Reference numeral 35 denotes a charging amount calculating means which is connected to the charging/discharging current detector 34. This charging amount calculating means 35 calculates electric energy "Q" stored in a power storage apparatus 21 based upon a current value detected by the charging/discharging current detector 34. In other words, the charging amount calculating means 35 accumulates a current value passing/flowing into/from the power storage apparatus 21, so that the electric energy Q stored in the power storage apparatus 21 is calculated. It should also be understood that the method for calculating the electric energy Q is not limited to the above-explained method of accumulating the current value passing/flowing into/from the power storage apparatus 21.

Reference numeral 36 shows a charging amount comparing means which is connected to both the charging amount setting value extracting means 33 and the charging amount calculating means 35. This charging amount comparing means 36 compares the charging target value Qc with the electric energy Q.

Reference numeral 37 shows a scale used to detect a load loaded on a car 5 of an elevator, namely the total number of passengers within the elevator car 5. A detection result obtained from this scale 37 is employed as one of information used to judge as to whether an operation of this elevator just after the scale 37 detects the load corresponds to a powering operation, or a regenerative operation.

Reference numeral 38 represents an elevator control information extracting means which is connected to the scale 37. This elevator control information extracting means 38 extracts control information of the elevator. This elevator control information is the total number of passengers present within the car 5 corresponding to the detection result of the scale 37, and an operation mode of the elevator. This operation mode of the elevator indicates a powering operation mode in which electric power is discharged from the power storage apparatus 21, a regenerative operation mode in which electric power is charged into the power storage apparatus 21, a stop mode in which the elevator is stopped.

Reference numeral 39 represents a charging/discharging instructing means which is connected to both the charging amount comparing means 36 and the elevator control information extracting means 38. This charging/discharging instructing means 39 judges/instructs as to whether the electric power is charged into the power storage apparatus 21, or the electric power is discharged from the power storage apparatus 21 based upon the comparison result between the charging target value Qc and the electric energy Q, and the control information of this elevator.

It should also be understood that the charging/discharging operation executed based on the elevator control information is to control the charging/discharging operation based on both the load given to the elevator car 5 and the drive direction of this elevator car 5. Either an ascending operation under light load or a descending operation under heavy load corresponds to a regenerative operation, which constitutes a charge mode in which the power storage apparatus 21 is charged. To the contrary, either an ascending operation under heavy load or a descending operation under light load corresponds to a powering operation which constitutes a discharge mode in which the power storage apparatus 21 is discharged.

Reference numeral 40 denotes an input/output unit voltage detector which is connected to the charging/discharging instructing means 39. This input/output unit voltage detector 40 detects a voltage value "V" appearing between the converter 11 and the inverter 15 of the charge/discharge control circuit 22. In response to this detection result, the charging operation to the power storage apparatus 21 and the discharging operation from the power storage apparatus 21 may be switched.

Also, reference numeral 41 indicates a charge/discharge control circuit which corresponds to a charge/discharge control means. This charge/discharge control circuit 41 is connected to both the charging/discharging instructing means 39 and the input/output unit voltage detector 40. In response to an instruction issued from either the charging/discharging instructing means 39 or the input/output unit voltage detector 40, this charge/discharge control circuit 41 charges the electric power of the DC main circuit between the converter 11 and the inverter 15 with the power storage apparatus 21, and/or discharges the electric power stored in the power storage apparatus 21 to this DC main circuit. Alternatively, the charge/discharge control circuit 41 may judge as to whether or not either the charge mode or the discharge mode is proper by employing the voltage value V detected by the input/output unit voltage detector 40. This charge/discharge control circuit 41 executes such a judgement based on the voltage value V by checking as to whether or not the voltage value V detected by the input/output unit voltage detector 40 is higher than a predetermined voltage value Vp. However, in the case that the instruction issued from the charging/discharging instructing means 39 is not made coincident with the judgment based on the voltage value V detected by the input/output unit voltage detector 40, the instruction issued from the charging/discharging instructing means 39 may be processed with a top priority.

It should be understood that the basic contents of the charge/discharge modes are given as follows: In the charge mode, the elevator is driven in the regenerative operation irrespective of the electric energy Q; the voltage value V exceeds the voltage value Vp; and the elevator is stopped when the electric energy Q is equal to or smaller than the charging target value Qc. In the discharge mode, the elevator is driven in the powering operation irrespective of the electric energy Q; and the voltage value V becomes lower than the voltage value Vp. In such a case that the elevator is driven in the powering operation when the electric energy Q becomes smaller than the charging target value Qc, the charging/discharging operation may not be performed. Also, when the electric energy Q is made coincident with the charging target value Qc, if the elevator is stopped, then the charging/discharging operation may not be performed.

As previously explained, while the charge mode is executed with employment of the power storage apparatus 21, since the elevator is operated by using the electric power charged into this power storage apparatus 21, it is possible to suppress an increase in peak electric power, as viewed from the commercial power supply. Thus, power consumption can be suppressed.

FIFTH ELEVATOR CONTROL METHOD

Figure 4:
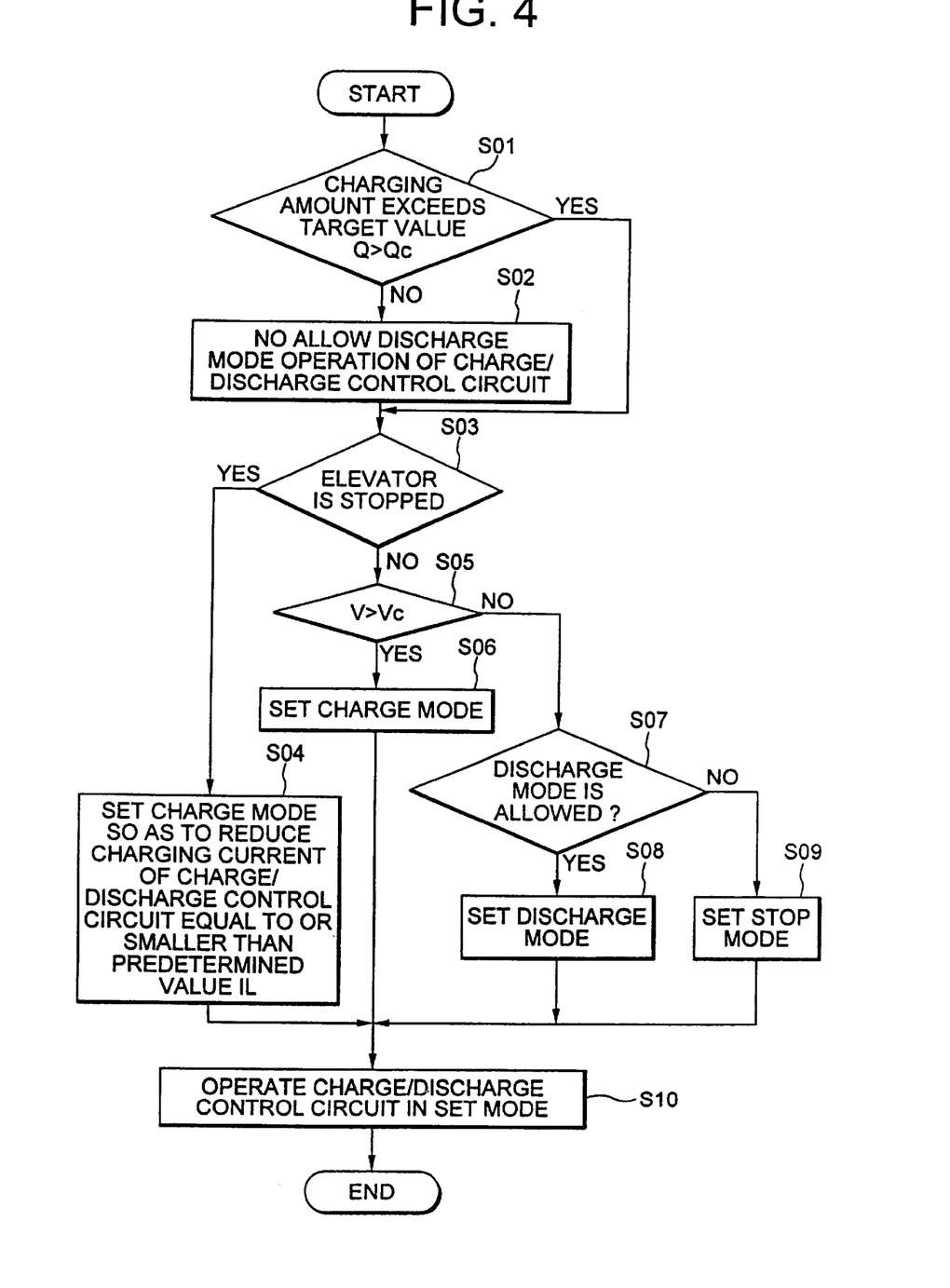
FIG. 4 is a flow chart describing an elevator control method executed in the elevator control apparatus according to the embodiment mode 5.

Referring now to FIG. 4, a description will be made of an elevator control method executed in the elevator control apparatus according to this fifth embodiment mode. That is, FIG. 4 is a flow chart describing the elevator control method performed in the elevator control apparatus of the fifth embodiment mode.

At a first step (hereinafter abbreviated to s) 01 of the flow chart shown in FIG. 4, the charging amount comparing means 36 judges as to whether or not the electric energy Q of the power storage apparatus 21 calculated by the charging amount calculating means 35 exceeds the charging target value Qc extracted by the charging amount setting value extracting means 33. When this electric energy Q does not exceed the charging target value Qc, this control process is advanced to a S02, whereas when this electric energy Q exceeds the charging target value Qc, the control process is advanced to a S03.

At the S02, the charging/discharging instructing means 39 does not allow the execution of this discharge mode by the charge/discharge control circuit 41. This may avoid the decrease in the electric energy Q which occurs when the discharge operation is carried out, although the electric energy Q stored in the power storage apparatus 21 is equal to or smaller than a predetermined charging target value Qc. As previously explained, since the charging/discharging instructing means 39 does not allow the execution of this discharge mode, namely instructs stopping of the discharge operation, the electric energy Q can easily exceed the charging target value Qc. Even when the electric energy Q does not exceed the charging target value Qc, the power storage apparatus 21 may discharge the electric power in an exceptional case. When the process operation defined at this S02 is ended, the control process is advanced to a further S05.

At the S03, the charge/discharge control circuit 41 confirms as to whether or not the elevator is stopped. While the elevator is stopped, the control process is advanced to a S04. To the contrary, when the elevator is not stopped, the control process is advanced to a S05.

At the S04, a charging current which is charged into the power storage apparatus 21 while the elevator is stopped is limited to a current equal to or lower than a predetermined value IL. While the elevator is stopped, the power storage apparatus 21 is charged by using not the regenerative power generated when the elevator is driven in the regenerative operation mode, but by using the electric power of the commercial power supply 1. However, such a condition that the commercial power supply 1 capable of continuously supplying sufficiently large electric power is employed although the elevator is stopped may consume a large amount of the commercial power supply 1, and furthermore, may disturb the reduction in the peak electric power from the commercial power supply 1. The charging operation from the commercial power supply 1 while the elevator is stopped may be carried out only by replenishing the electric power lower than the charging target value Qc for the power storage apparatus 21. Also, since this charging operation need not be carried out in an urgent condition, the charging current value is limited in order not to unnecessarily increase the power consumption of this commercial power supply 1. Therefore, while the elevator is stopped, the current value of this charging current charged into the power storage apparatus 21 is limited so as to suppress the power consumption of the commercial power supply 1. Moreover, while the peak electric power of the commercial power supply 1 is reduced, the power storage apparatus 2 can be charged. When this process operation of the S04 is ended, the control process is advanced to a S10.

At the S05, the charge/discharge control circuit 41 judges as to whether or not the voltage value V appearing on the bus line between the converter 11 and the inverter 15 exceeds a predetermined voltage value Vc. That is, when the voltage value V is higher than the predetermined voltage value Vc, since the bus line voltage is brought into such a high voltage condition due to the regenerative power, the charge mode is set by which the power storage apparatus 21 can be charged. Conversely, when the voltage value V is lower than the predetermined voltage value Vc, since this condition is such that the electric power required to drive the elevator is shortage, the electric power is supplied from the power storage apparatus 21 to the DC main circuit. It should be understood that when the voltage value v is made coincident with the predetermined voltage value Vc, it is assumed that neither the charge mode nor the discharge mode is instructed, but the stop mode is instructed. When the voltage value V exceeds the predetermined voltage value Vc, the control process is advanced to a S06. Conversely, when the voltage value V does not exceed the predetermined voltage value Vc, the control process is advanced to a S07.

At the S06, the charge mode is set. That is, an instruction is issued in such a manner that the charge/discharge control circuit 41 can be operated in the charge mode. When this process operation is ended, the control process is advanced to a S10

At the S07, the charge/discharge control circuit 41 judges as to whether or not the discharge mode is allowed. This judgment is made so as to prevent the following problem. That is, when the power storage apparatus 21 is not yet charged up to the charging target value Qc, the discharge mode is executed, so that the electric energy Q stored in this power storage apparatus 21 is further reduced. As a result, in this discharge mode, only when this discharge mode is allowed, the power storage apparatus 21 discharges the stored electric power. When the discharge mode is allowed, the control process is advanced to a S08, whereas when the discharge mode is not allowed, the control process is advanced to a S09.

At the S08, the discharge mode is set. In other words, such an instruction is issued in such a way that the charge/discharge control circuit 41 can be operated in the discharge mode. When this process operation of the S08 is ended, the control process is advanced to the S10.

At the S09, the stop mode is set. In other words, such an instruction is issued in such a way that the charge/discharge control circuit 41 is not operated in either the discharge mode or the charge mode. When this process operation of the S09 is ended, the control process is advanced to the S10.

At the S10, the charge/discharge control circuit 41 is operated in the set operation mode. In other words, such an allow is made that the charge/discharge control circuit 41 can be operated in the set mode. When either the charging operation or the discharging operation can be performed in the charge/discharge control circuit 41, this charge/discharge control circuit 41 is operated in the set operation mode.

It should also be noted that the charge/discharge control circuit 41 monitors the voltage appearing in either the DC main circuit or the power storage apparatus 21, and may check as to whether or not either the charging operation or the discharging operation can be carried out based upon the respective structural elements.

No specific explanation is made of the control operation with respect to the converter 11 in this fifth embodiment mode. This is because this converter 11 may be formed in a controllable form. That is, since this converter 11 is supposed to be formed by a diode bridge, this converter 11 may be formed by using a switching element such as a transistor.

As explained above, when the converter 11 is controllable, the charging/discharging operations for the power storage apparatus 21 can be carried out by increasing/decreasing the voltage appearing on the output side of the converter 11, namely the voltage value v of the DC main circuit.

VARIOUS ADVANTAGES

While the various preferred embodiments of the present invention have been described in detail, the below-mentioned various advantages thereof can be achieved.

According to the elevator control apparatus of the present invention, is comprised of: the converter for rectifying AC electric power to be converted into DC electric power; the inverter for inverting the DC electric power into AC electric power having the variable voltage and the variable frequency; the motor driven by the AC electric power having the variable voltage and the variable frequency so as to operate the elevator; the power storage apparatus for charging thereinto AC electric power; and charge/discharge control means for controlling charging/discharging operation with respect to the power storage apparatus based upon the charging target value every time with respect to the power storage apparatus. Since the electric power stored in the power storage apparatus is utilized based upon the charging target value every time, the power consumption of the commercial power supply can be reduced.

Also, the charging target value owned by the elevator control apparatus according to the present invention may indicate such a charging amount by which the elevator can be operated in the emergency case. Since the power storage apparatus is charged based upon this charging target value, even when emergencies such as power interruption and earthquake happen to occur, occurrences of secondary disasters can be prevented. For example, passengers are locked upon in elevators.

Furthermore, the power storage apparatus employed in the elevator control apparatus, according to the present invention, is charged by the commercial power supply when the elevator is stopped. That is, this power storage apparatus can be charged while using spare time during the elevator operation and also suppressing such a phenomenon that the power consumption is instantaneously increased. As a result, a total amount of electric power supplied from the commercial power supply during the peak power-consumption time period can be suppressed.

Also, in accordance with the elevator control apparatus of the present invention, when the power storage apparatus is charged by using the electric power supplied from the commercial power supply, the current value of this commercial power supply is limited. As a consequence, low-cost operation of this elevator can be realized based upon the electric power rate system which is directly proportional to the used maximum electric power.

What is claimed is:

1. An elevator power management system, the system comprising:

a power storage apparatus;

a converter for rectifying AC electric power from a power source into DC electric power for operating an elevator and for charging said power storage apparatus;

an inverter for inverting DC electric power from said converter and from said power storage apparatus into AC electric power having a variable voltage and a variable frequency for driving the elevator;

a motor driven by the AC electric power to operate the elevator; and charge/discharge control means coupled to said converter, said inverter, and said power storage apparatus for controlling charging and discharging of said power storage apparatus based upon a charge target value of said power storage apparatus, stored in said charge/discharge control means, and that varies with time of day.

2. The elevator power management system as claimed in claim 1 wherein:

the charge target value is lower during a peak power-consumption time period than during other time periods; and said charge/discharge control means controls the charging and discharging of said power storage apparatus in accordance with the charge target value.

3. The elevator power management system as claimed in claim 1 wherein the charge target value is set to a maximum within a time period just before a peak power-consumption time period, and is gradually decreased during the peak power-consumption time period.

4. The elevator power management system as claimed in claim 1 wherein the charge target value is gradually increased during periods of minimal operation of the elevator, and becomes a maximum at a time before full scale operation of the elevator.

5. The elevator power management system as claimed in claim 1 wherein the charge target value corresponds to at least a charge amount of said power storage apparatus sufficient to operate the elevator in an emergency.

6. The elevator power management system as claimed in claim 1 wherein when charge of the power storage apparatus is smaller than the charge target value, discharging of said power storage apparatus is stopped.

7. The elevator power management system as claimed in claim 1 wherein when the elevator is stopped, said power storage apparatus is charged with the AC electric power and the AC electric power is supplied from a commercial power supply.

8. The elevator power management system as claimed in claim 1 wherein when said power storage apparatus is charged using the AC electric power from a commercial power supply, current from the commercial power supply is limited.

* * * * *